United States Patent Office 3,514,056
Patented May 26, 1970

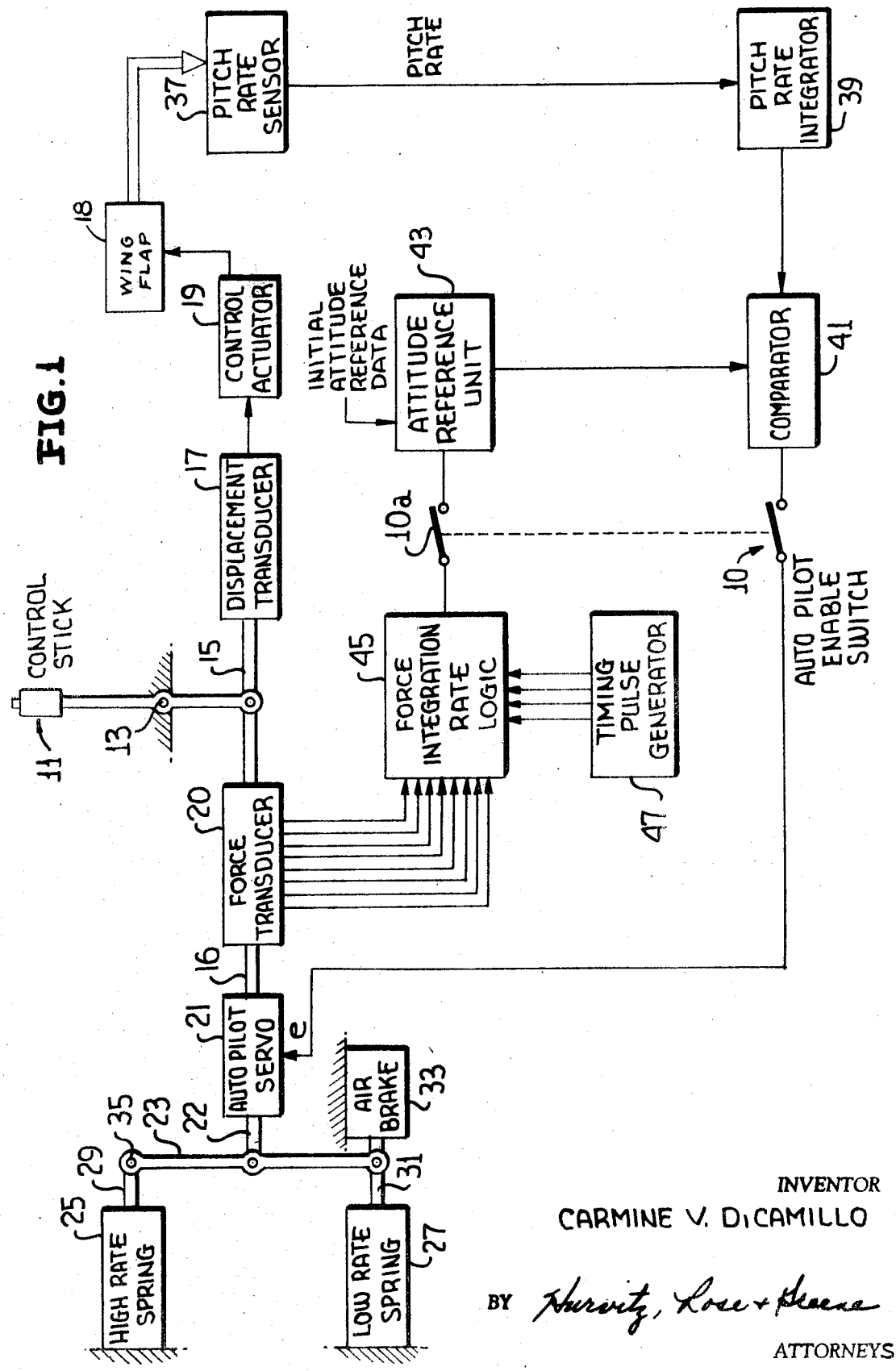

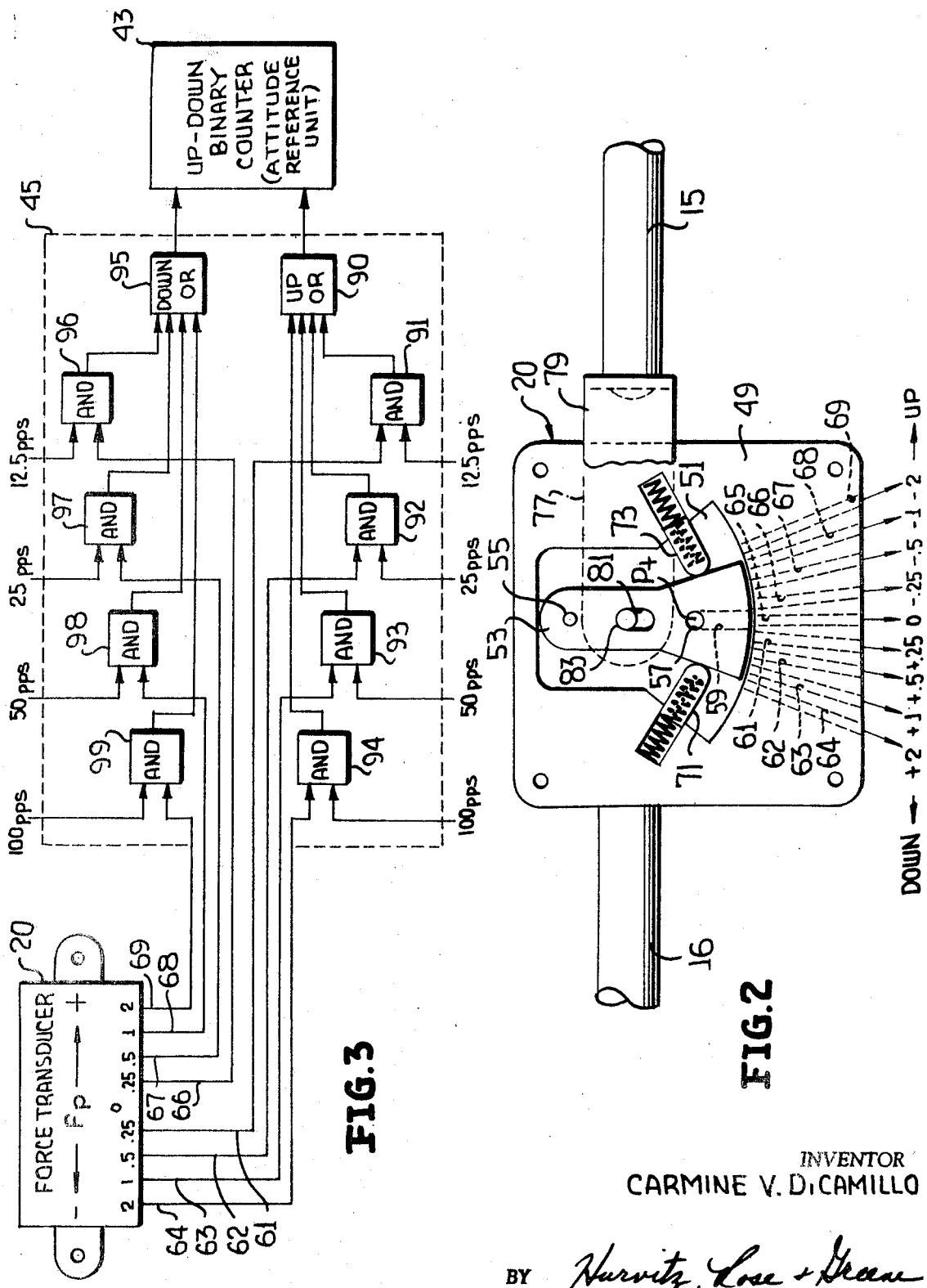

3,514,056
FORCE TRANSDUCER AND FORCE INTEGRATION RATE LOGIC
Carmine V. Di Camillo, Silver Spring, Md., assignor to Bowles Engineering Corporation, Silver Spring, Md., a corporation of Maryland
Filed Apr. 23, 1968, Ser. No. 723,534
Int. Cl. B64c *13/36, 13/40*
U.S. Cl. 244—78                                22 Claims

ABSTRACT OF THE DISCLOSURE

A force transducer includes a hollow pipe adapted to issue a fluid stream pivotally mounted on a frame and biased to a neutral angular position by a pair of springs secured to the pipe and frame. A plurality of outlet channels are formed in the frame at spaced locations for selectively receiving the fluid stream at corresponding angular positions of the pipe. Application of a differential force across the pipe and frame produces rotation of the pipe to provide appropriately weighted fluid output signals at the outlet channels as a function of the applied force. The weighted signals are received as input signals by respective AND gates and serve to selectively gate respective pulse trains having repetition rates which are related as a function of the weights of the fluid signals. Gated pulses are stored in a counter which provides an indication of the integrated applied forces.

BACKGROUND OF THE INVENTION

The present invention relates to force transducers and, more particularly, to a device for deriving signals as a function of an applied force and to circuitry for processing the force signals in order to render them suitable for integration. It is to be understood that the force transducer and force integration rate logic circuitry described herein have broad applicability as components in numerous types of systems; however, in order to facilitate the description of the preferred embodiments of the present invention, these components are described herein as part of an automatic flight control system.

When an automatic flight control system is placed in the AUTOPILOT mode, it is important that the pilot be able to manually inject corrective measures as these become necessary. For example, if the craft is flying at a predetermined attitude under AUTOPILOT control, it may be necessary to modify the attitude somewhat as varying weather, terrain, and traffic conditions arise. Preferably, this is to be achieved by having the pilot apply a force to the attitude control stick to modify the reference attitude sought by the AUTOPILOT control circuitry. One method of achieving this result is to provide a force transducer which senses forces applied by the pilot to the control stick and generates fluid signals as a function thereof. These fluid signals may then be utilized to modify the stored craft reference attitude to which a signal representative of actual craft attitude is compared in the AUTOPILOT circuit. In order to minimize space requirements, the force transducer is preferably a link in the pilot controller force linkage and, as such, must be capable of transmitting force levels several times larger than its own operating range. In addition, the force transducer should be a relatively inextensible force link in order that efficient force coupling may be achieved.

It is therefore an object of the present invention to provide a force transducer for generating fluid signals as a function of forces applied to the transducer.

It is another object of the present invention to provide a network for integrating fluid signals.

It is still another object of the present invention to provide a force transducer responsive to forces applied thereto to provide binary signals representative of the applied forces and to provide means for integrating the binary signals.

SUMMARY OF THE INVENTION

The force transducer of the present invention comprises a pipe which is translatably mounted relative to a frame. The pipe is adapted to issue a stream of fluid. The frame has a plurality of spaced outlet passages defined therein for receiving the stream of fluid at locations corresponding to various relative displacements of the pipe and frame to produce quantized fluid signals each indicative of a different force level. The pipe is biased to a neutral position relative to the frame by springs. Upon application of a differential force across the pipe and frame, the two are displaced relative to one another as a function of the differential force; the precise function of the force being determined by the characteristic of the springs. Reception of the fluid stream by various of the outlet passages indicates the degree of displacement of the pipe relative to the frame and hence, the magnitude and, if desired, direction of the differential force applied across the frame and pipe.

The force integration rate logic unit of the present invention receives two groups of input signals; namely, the force level signals from the force transducer and a plurality of pulse trains having repetition rates which bear the same ratios to one another as the quantized force signals bear to one another. The function of the force integration rate logic is to relate pulse rates to force signals to provide an integrated force signal. The relating of force to pulse rate is achieved by utilizing the force level signals as gating signals which activate AND gates to permit passage of the appropriate pulse trains. The pulses passed by each gate are combined and are accumulated by a binary counter to provide a final count at the end of a specific interval of time indicative of the average magnitude of the force signals generated during that interval.

BRIEF DESCRIPTION OF THE DRAWINGS

The above and still further objects, features and advantages of the present invention will become apparent upon consideration of the following detailed description of the specific embodiments thereof, especially when taken in conjunction with the accompanying drawings, wherein:

FIG. 1 is a block diagram of an automatic fluid control system employing the force transducer and force integration rate logic unit of the present invention;

FIG. 2 is a plan view in partial section of the force transducer of the present invention; and FIG. 3 is a block diagram of the force integration rate logic unit of the present invention.

DESCRIPTION OF THE PREFERRED EMBODIMENT

Referring now specifically to FIG. 1 of the accompanying drawings, there is illustrated a block diagram of an automatic flight control system for the purpose of exemplifiying a functional embodiment of the force transducer and the force integration rate logic unit of the present invention. When the system is in the manual operational mode, as for example, when the AUTOPILOT ENABLE switch 10 is open, the pilot retains complete control over attitude by means of control stick 11. Application of a force to the control stick handle causes the control stick 11 to pivot about a fixed pivot point 13 and displace a shaft 15. Displacement of shaft 15 actuates displacement transducer 17 which may be of the type disclosed in my co-pending U.S. patent application Ser. No. 557,146, filed June 13, 1966. Displacement transducer 17 requires little or no force to move or hold in position, and provides a hydraulic output signal proportional to the displacement of shaft 15. The hydraulic output signal from displacement transducer 17 is received by a control actuator 19 which may be a conventional hydraulic actuating device and which acts to achieve the desired craft attitude by, for example, extending or retracting an appropriate flap 18 on the wing of the craft in response to the hydraulic signal.

A further force linkage train connected in series with shaft 15 includes a force transducer 20 to be described in greater detail below, shaft 16 and AUTOPILOT servo 21. Servo 21 is a device which produces translation of shaft 16 relative to its frame in response to fluid input signals, such as error signal $e$, and may assume the general configuration of the servo disclosed in U.S. Pat. No. 3,058,450 to Lissau. The frame of AUTOPILOT servo 21 is connected to the center of a cross bar 23 by a shaft 22 which is secured to the servo frame. Cross bar 23 has its ends connected respectively to a high rate spring 25 and a low rate spring 27. An end of each of the springs is connected to the aircraft frame, the other ends of the springs being connected respectively to push rods 29 and 31, the two push rods being pivotally attached to either end of the cross bar 23. Push rod 31 from the low rate spring extends beyond cross bar 23 and enters an air brake assembly 33. Air brake 33 is normally off when the system is in the manual operational mode.

Assuming both the AUTOPILOT servo 21 and the force transducer 20 to be inextensible linkages, in the manual operational mode, the low rate spring 27 is free to flex since its push rod 31 is not bound by the de-activated air brake 33. In relation to low rate spring 27, the high rate spring 25 is quite stiff and appears as if the pivot 35, between push rod 29 and cross bar 23 is fixed to the craft frame. Thus, in the manual operational mode, any pilot-initiated forces applied to the control stick 11 work against the low rate spring 27 to apply attitude control forces to displacement transducer 17.

In the AUTOPILOT operational mode, air brake 33 is actuated and AUTOPILOT ENABLE switch 10 is closed, activating the AUTOPILOT feedback loop. Air brake 33 holds push rod 31 rigid so that the control stick acts against the high rate spring 25. As an example of the different effects produced by the high and low rate springs, assume that the low rate spring reflects a gradient of one pound per inch of displacement at the control stick 11 and the high rate spring reflects a gradient of twenty pounds per inch of displacement of control stick 11. The AUTOPILOT servo 21 receives an error signal $e$ from the feedback loop and positions the shaft 16 and hence the pilot control stick 11 and the displacement transducer 17 in accordance therewith. Error signal $e$ is derived in the following manner: A pitch rate sensor 37 senses the pitch rate of the craft to provide an appropriate pitch rate fluid output signal. Pitch rate sensor 37 may be a device of the type described in co-pending U.S. patent application Ser. No. 430,697 by E. M. Dexter, filed Feb. 5, 1965. The fluid pitch rate signal is integrated in a pitch rate integrator 39 and fed to a comparator 41. The integrated pitch rate signal is compared at comparator 41 to an attitude reference signal stored in attitude reference unit 43. As will be described in detail below, attitude reference unit 43 is a binary counter which receives attitude reference data when the system is placed in the AUTOPILOT mode and receives reference attitude update information from the force integration rate logic unit 45. The integrators 39 and 43 and the comparator 41 may be of the types described in co-pending U.S. application Ser. No. 500,672 by W. C. O'Neill and filed on Oct. 22, 1965, now abandoned in favor of continuation application No. 731,817, filed May 24, 1968. Comparator 41 generates the error signal $e$ as a function of the difference between the integrated pitch rate as derived by integrator 39 and the reference attitude as stored in integrator 43.

The reference attitude at integrator 43 is initially set (by circuitry not illustrated) to the attitude of the craft at the time AUTOPILOT ENABLE switch 10 is closed. The reference attitude may be changed by use of force transducer 20 and force integration rate logic unit 45, both of which are described in greater detail subsequently. Suffice it to say at this point that the force transducer produces a plurality of binary signals which are weighted appropriately to represent magnitude and direction of a force applied by control stick 11 during the AUTOPILOT mode. These binary signals are applied to the force integration rate logic unit 45 which also receives a plurality of pulse trains having differing repetition rates from a timing pulse generator 47. Pulse generator 47 may comprise a plurality of individual pulse generators, for example of the type illustrated and described in U.S. Pat. No. 3,320,966, one such generator being used to generate each pulse train; alternatively, a single such generator may be employed as a pulse source for a counter, for example of the type illustrated and described in U.S. Pat. No. 3,305,170, which would then provide the various pulse trains from respective counter stages. The various force signals act to gate the various pulse trains to provide a series of output pulses at a net frequency which is a function of the force applied to control stick 11. These output pulse are applied to the force integrator 43 which, for purposes of the present system, is an up-down binary counter such as that disclosed in U.S. Pat. No. 3,224,674. Thus, in the AUTOPILOT operational mode, whenever the pilot desires to change the reference attitude of the craft, he applies a small force to control stick 11 which the force transducer 20 converts to an appropriate binary fluid singal representing the magnitude and direction of the force. The force signals are processed at force integration rate logic unit 45 and integrated at force integrator 43 to update the reference attitude to which the actual craft attitude is compared at comparator 41. It may be seen therefore that in the AUTOPILOT mode, the pilot may apply a small force to the control stick 11, the force being in the working range of the force transducer, in order to indirectly change the craft reference attitude via the AUTOPILOT feedback loop. The pilot has the option of applying a somewhat larger force, beyond the working range of force transducer 20, whereby to work against high rate spring 25 through AUTOPILOT servo 21 and force transducer 20, both acting as inextensible links, to directly translate shaft 15 and displacement transducer 17 in order that the pilot will have overriding authority to control the craft against a runaway AUTOPILOT servo condition. The reason for requiring different spring gradients is to provide the control stick with a comfortable level of centering force during the manual mode such that the stick will not fall hard over and cause the craft to execute a hard pitch maneuver if the pilot should momentarily release it; yet in the AUTOPILOT mode of operation, the AUTOPILOT servo should have its frame rigidly attached to the airframe. Since the AUTOPILOT servo might be a hydraulic actuator capable of developing forces greater than the pilot can oppose, the high rate spring is required between AUTOPILOT servo and airframe so that the pilot, in deflecting said spring, can oppose an erratic autopilot servo extension and control the craft until he is able to disengage the AUTOPILOT mode of operation.

The detailed operation of the system illustrated in FIG. 1 will become clearer with a more detailed understanding of the operation of force transducer 20 and the force integration rate logic unit 45.

Referring now to FIG. 2, there is illustrated in plan view a force transducer 20 of the type employed in the system of FIG. 1. Force transducer 20 comprises a frame member 49, which in the particular embodiment described, is substantially rectangular and has a generally bell-shaped chamber 51 defined interiorly thereof. Frame 49 may be formed as a single integral member or, alternatively, it may comprise a central plate through which the chamber 51 is defined, the central plate being sandwiched at its opposite faces by a pair of closed sealing plates (not illustrated). A rotatable member 53 is pivotally mounted about a point 55 located near the top (as illustrated in FIG. 2) or apex of bell-shaped chamber 51. Rotatable member 53 is illustrated as also being substantially bell-shaped, but somewhat narrower than chamber 51. The base of the bell-shaped rotatable member 53 is disposed adjacent the base of bell-shaped chamber 51 so that, upon rotation of member 53 about pivot point 55, the base of member 53 is translated oppositely of and relative to the base wall of chamber 51. A source of fluid under pressure (designated schematically as P+ in FIG. 2) is connected to a port 57 defined in rotatable member 53. Port 57 communicates with a nozzle 59 extending through the base surface of rotatable member 53 whereby to issue a stream of the pressurized fluid toward the base wall of bell-shaped chamber 51. A plurality of ports are formed in the base wall of bell-shaped chamber 51 and each communicates with a different one of outlet passages 61–69 which extend through the frame 49. Depending upon the rotational position of member 53, the fluid stream issued from nozzle 59 is directed toward different ones of outlet passages 61–69. A pair of spring pins 71 and 73 extend from respective recesses formed in opposite sidewalls of the bell-shaped chamber 51 into engagement with rotatable member 53 so as to bias the latter in a central or neutral position within the chamber. With member 53 so biased, nozzle 59 is disposed in substantial alignment with outlet passage 65. Outlet passages 61 and 66 are symmetrically disposed on either side of outlet passage 65 as are outlet passage pairs 62 and 67, 63 and 68, and 64 and 69.

Force transducer 20 is connected as a force link in the force transmission system of FIG. 1 in the following manner: Shaft 16 is secured to frame 49 such that the longitudinal axis of shaft 16 is perpendicular to the longitudinal axis of output passage 65. The side of frame 49 opposite that to which shaft 16 is connected has a narrow channel 77 extending therethrough and into chamber 51 substantially coaxially of shaft 16. A linking member 79 is slidably disposed within channel 77 and extends from within chamber 51 to a location external of the frame 49. Linking member 79 is offset from the plane of rotatable member 53 (perpendicularly of the plane of the drawing) so as to extend therebehind in chamber 51. A cylindrical projection 83 extends perpendicularly from linking member 79 toward rotatable member 53 to engage the latter through a suitable slot 81 formed therein. Slot 81 is located somewhere between the pivot point 55 and the base of member 53. It is important that clearance be provided between linking member 79 and the tube (not illustrated) by which the pressurized fluid is supplied from source P+ to port 57. This tube extends through a suitably provided hole (not illustrated) in the rear of frame 49. Shaft 15 is secured to linking member 79 so as to extend from frame 49 in substantially coaxial relation with shaft 16.

A differential force exerted longitudinally between shaft 15 and shaft 16 (such as by a force on control stick 11 acting against the high rate spring 25) acts to displace linking member 79 and hence rotatable member 53 relative to frame member 49. This relative displacement, however, depends upon the exertion of a sufficient differential force relative to the tension in the spring pins 71 and 73. Specifically, if there is nothing to restrain motion of shaft 16 in the direction of the force applied by shaft 15, the force along shaft 15 tends to displace the entire force transducer 20 as a unit without providing displacement of member 53 relative to the frame 49. If, however, there is some means provided to resist motion of shaft 16 (such as high rate spring 25) in the direction of a force applied by shaft 15, shaft 15 acts to displace linking member 79 about pivot 55 to an extent and in a direction depending upon the magnitude and direction of the force applied. This displacement causes pressurized fluid from nozzle 59 to be directed to one of output passages 61–64 and 66–69. The signals received at the various output passages are assigned weights related to the applied force, such weighting taking into account both the position of the various output passages relative to the neutral position of member 53, and the spring constants of spring pins 71 and 73. As described in detail hereinbelow, these weighted signals at passages 61–64 and 66–69 are employed as gating signals for respective fluid pulse trains emanating from pulse generator 47, the frequencies of the pulse trains being proportional to (or, if desired, some other function of) the forces required to produce their respective gating signals. Once the force applied to shaft 15 is removed, the bias action provided by spring pins 71 and 73 serves to return the rotatable member 53 to its neutral position whereby nozzle 49 is in alignment with outlet passage 65. Outlet passage 65 is designated as the zero force outlet passage and receives fluid only when the differential force across rotatable member 53 and frame 49 is insufficient to produce relative displacement.

Assume, as suggested above, that the high rate spring 25 reflects a gradient of twenty pounds per inch of displacement at control stick 11, and that low rate spring 27 reflects a gradient of one pound per inch of displacement at the control stick. Assume further that the tension in spring pins 71 and 73 is such that the maximum range of the force transducer 20 is ±2 pounds when control stick 11 is operating against high rate spring 25. Under such conditions, in the AUTOPILOT operational mode, a two pound force applied to control stick 11 when it is in its centered position produces a relatively small displacement of the control stick but a full range deflection of rotatable member 53 relative to frame 49 in force transducer 20. For forces above two pounds applied to the control stick in this mode, the force transducer becomes effectively saturated. When force transducer 20 is saturated, the lower portion of the sidewall of rotatable member 53 abuts a lower portion of the sidewall of chamber 51 and the force transducer acts as a substantially inextensible force linkage between shafts 15 and 16. In the manual operational mode, signals produced by the force transducer are not utilized to affect the autopilot loop. This is illustrated by section 10a of the AUTOPILOT ENABLE switch which is open in this mode.

In the AUTOPILOT operation mode, the autopilot servo 21 translates shaft 16 as commanded by error signal e to provide appropriate translation of shaft 15 and displacement transducer 17. For this purpose, the force transducer 20 responds to autopilot-initiated translations of shaft 16 in the manner of an inextensible force linkage between shaft 16 and shaft 15. This is so because the displacement transducer 17 requires little or no force to move it and the control stick is in effect a "dead stick" in the AUTOPILOT mode, so that no counter force is produced along shaft 15 sufficient to cause relative displacement of member 53 and frame 49 in transducer 20. Spring pin 73 is therefore not compressed nor is spring pin 71 extended and therefore rotatable member 53 is maintained stationary relative to frame 49.

Since force transducer 20 is a link in the force transmission chain, it is important that the translation of rotatable member 53 be kept small in order that the force transducer link be relatively inextensible. This may be achieved by keeping the size of the transducer and its components small. Of course, the size required of the transducer depends to some extent on the particular application in which it is employed. In an actually constructed force transducer having an operative range of plus or minus two pounds, the frame 49 was three inches square and approximately three-quarters of an inch thick; nozzle 59 was approximately one-eighth inch in diameter; receiving passages 61–69 were approximately one-sixteenth by one-eighth inch rectangular cross section. The cross section of nozzle 59 is sufficiently large relative to the cross section and spacing of outlets 61–69 that more than one of two adjacent outlet passages may receive fluid from the supply nozzle 59 when the nozzle straddles two adjacent passages; this is not a necessary configuration, however, and may be dispensed with where specific system considerations dictate exclusive output signal requirements. However, for purposes of the system illustrated in FIG. 1 and the force integration rate logic unit to be described below, this "make-before-break" feature is advantageous for reasons that will become apparent.

Referring now to FIG. 3 of the accompanying drawings, there is illustrated schematically a force integration rate logic circuit and its interconnections to the force transducer 20 and the timing pulse generator 47 of FIG. 1. Force integration rate logic circuit 45 comprises eight AND gates 91–94 and 96–99, and two OR gates 90 and 95, respectively. AND gates 91–94 and 96–99 are pure fluid gates which may take the form of the gates described in U.S. Pat. No. 3,277,915 to Dockery. OR gates 90 and 95 are pure fluid OR gates which may take the form of the OR gate illustrated in U.S. Pat. No. 3,240,219 to E. M. Dexter and D. R. Jones. OR gate 90, referred to herein as the "up" OR gate receives four input signals corresponding to the four output signals from respective AND gates 91–94. OR gate 95, referred to herein as the "down" OR gate receives four input signals corresponding to the output signals from AND gates 96–99. Each of the AND gates receives two input signals, one corresponding to a respective force signal received from force transducer 20 and the other being a pulse train from timing pulse generator 47. The AND gate receiving the force signal corresponding to the lowest positive force also receives the lowest frequency pulse train from the timing pulse generator 47; the AND gate receiving the next highest force signal similarly receives the next highest frequency pulse train; etc. Thus, AND gate 91 receives an input signal from output passage 61 of force transducer 20 which may correspond to a +0.25 pound force applied across the force transducer. AND gate 91 also receives a 12.5 p.p.s. pulse train input signal. AND gate 96 receives a force signal from outlet passage 66 corresponding to −0.25 pound and a pulse train of 12.5 p.p.s. In like manner, AND gates 92–94 and 97–99 receive output signals from output passages 62–64 and 66–69, respectively of force transducer 20 which in turn correspond to forces of +0.5, +1.0, +2.0 and −0.5, −1.0, −2.0 pounds. Similarly, gates 92 and 97 also receive a 25 p.p.s. signal, gates 93 and 98 receive a 50 p.p.s. signal and gates 94 and 99 receive a 100 p.p.s. signal. The specific frequencies of the pulse trains received by the various AND gates, of course, applies to the specific embodiment disclosed by applicant and are by no means to be construed as limiting. It is to be noted that the frequencies of the timing signals received by the AND gates are related to one another in the same manner as the forces represented by the force signals received by these AND gates. Specifically, the ratio of the frequencies applied to any two of the AND gates is the same as the ratio of the forces represented by the input signals to those AND gates from force transducer 20. This too is a feature which is desirable in the system of FIG. 1; however, the various frequencies may be related to the force levels by any desired function within the scope of this invention.

The force signals from force transducer 20 are divided into two groups representing plus and minus signals respectively. The four plus forces are received by AND gates 96–99, the outputs from which are fed to the "down" OR gate 95; the four minus force signals are fed to AND gates 91–94, the outputs from which are fed to the "up" OR gate 90. The output signals from OR gates 90 and 95 are fed to the up and down inputs, respectively, of an up-down binary counter which corresponds to the attitude reference unit 43 illustrated in FIG. 1.

In operation, the function of the force integration rate logic unit is to relate pulse rates to the force signals received from force transducer 20 and to merge the pulse rate to a net up or down pulse rate to be counted in the up-down counter 43. The various pulse rate signals received from the timing pulse rate generator 47 (FIG. 1) are passed by their respective AND gates only when respective input signals are received from the force transducer. Thus, if a force signal appears at passage 61, AND gate 91 is enabled and passes a 12.5 p.p.s. signal to "up" OR gate 90 which in turn feeds this 12.5 p.p.s. signal to the up input of up-down counter 43. Similarly, if a signal appears, for example, at output passage 67 of force transducer 20, AND gate 97 is enabled so as to pass a 25 p.p.s. signal to "down" OR gate 95 which in turn passes this signal to the down input of up-down binary counter 43. All of the gated "up" input pulses are merged into the "up" OR gate 90 and all of the "down" pulses are merged into the "down" OR gate 95. It is possible to open more than one AND gate if more than one force signal is present with the result that the appropriate OR gate receives the highest gated pulse rate rather than the sum of the pulse rates. This because the different pulse rates are phase-synchronized so that every pulse in the 50 p.p.s. train is time coincident with alternate pulses in the 100 p.p.s. train, every pulse in the 25 p.p.s. train is time coincident with every fourth pulse in the 100 p.p.s. train etc. Thus, if force signals are received on both output passages 61 and 62 of force transducer 20, both AND gates 91 and 92 are activated. AND gate 91 passes a 12.5 p.p.s. signal and AND gate 92 passes a 25 p.p.s. signal. The "up" OR gate 90, however, can only discern the higher or the 25 p.p.s. input signal and therefore the up-down counter receives signals only at this higher rate. The force integration rate logic unit therefore acts to pass a pulse rate signal which is proportional to the input force signal from the force transducer 20.

It is to be understood that details of the above description of the force transducer and force integration rate logic unit are not intended to be construed as limiting the scope of the present invention. For example, for some applications, it may not be necessary to provide bi-directional force signals; in which case rotatable member 53 can be adjusted to quiescently (i.e., in its neutral position) abut one of the sidewalls in chamber 51 whereby fluid signals in the various output passages will represent unidirectional forces of variable magnitude. Further, the number of passages in force transducer 20 may be increased or decreased as desired, as can be the range of forces over which the transducer is operative. The latter, of course, can be changed as a function of the constants of spring pins 71 and 73 or the size of chamber 51. In addition, the various force signals produced at the output passages need not be sequentially related by the same factor as is the case for the force transducer of FIG. 2 wherein adjacent output passages provide output signals in a two-to-one relation. Specifically, the output passages may be positioned to provide any force related signal by properly choosing a spring constant to give a desired force characteristic or by properly choosing the repetition frequencies applied at the force integration rate logic unit. With regard to the latter feature, it is clear that the output passages may produce signals which are linearly related whereas the frequencies applied to the corresponding AND gates are related by some nonlinear or different linear function.

In addition, in accordance with the principles of the present invention, the bell-shaped configuration for rotatable member 53 and the chamber 51 is not limiting. Specifically, any two members which are translatable (not necessarily rotatably) relative to one another, wherein one of the members issues a stream of fluid and the other member receives the stream at varying locations as a function of the relative translation between the members, is properly within the scope of the present invention. The two members should be position-biased relative to one another, as by springs or other suitable means, the biasing means determining the force versus displacement characteristic of the transducer as well as its operating range.

In addition, three dimensional configurations are possible to produce fluid output signals proportional to the magnitude and duration of the forces applied from any angle between two translatable members. In such cases, groups of output passages would extend radially from the neutral position of the nozzle issuing the fluid stream.

While I have described and illustrated one specific embodiment of my invention, it will be clear that variations of the details of construction which are specifically illustrated and described may be resorted to without departing from the spirit and scope of the invention as defined in the appended claims.

I claim:

1. In a system wherein a force applied to a first element is transmitted to a second element, a force transducer disposed between said elements for transmitting said force therebetween and for providing a fluid signal as a function of the differential force produced by said applied force across said elements, said force transducer comprising:

a first member having means for issuing a fluid stream;
a second member having fluid receiving means, said fluid receiving means comprising at least three spaced outlet passages;
means for mounting said first and second members for displacement relative to one another in response to application of a differential force across said members, said outlet passages being disposed such that each receives said fluid stream at respective relative positions of said first and second members;
means for securing said first member to said first element and for securing said second member into said second element such that differential forces applied across said elements are applied across said members; and
bias means for providing a counterforce to oppose differential forces applied across said members, said counterforce acting to prevent relative displacement of said members upon application of differential forces thereacross below a predetermined level and for defining the degree of relative displacement of said members upon application of differential forces thereacross above said predetermined level.

2. The combination according to claim 1 wherein said means for mounting comprises means for pivotally mounting said first member on said second member such that said first member is angularly displaced relative to said second member in response to application of a differential force across said members above said predetermined level.

3. The combination according to claim 2 wherein said second member comprises a frame having a chamber defined therein, said outlet passages communicating between said chamber and the exterior of said frame.

4. The combination according to claim 3 wherein said chamber has a wall which is contoured to match the configuration of one side of said first member and wherein said first member is mounted such that upon application of differential forces across said members above a second predetermined level exceeding said first predetermined level said one side of said first member abuts said wall of said chamber to prevent further relative displacement of said members.

5. The combination according to claim 4 wherein said bias means comprises a pair of spring members engaged between said first and second members to resist relative displacement therebetween.

6. The combination according to claim 4 wherein said bias means comprises a pair of spring members engaged between said first member and respective opposing walls of said chamber to maintain said first member in a neutral position relative to said frame, different ones of said fluid passages being spaced on opposite sides of said first member in its neutral position to receive said fluid stream in response to relative displacements of said first and second members in either of two respectively opposite directions.

7. The combination according to claim 1 wherein said second member comprises a frame having a chamber defined therein, said outlet passages communicating between said chamber and the exterior of said frame.

8. The combination according to claim 7 wherein said bias means comprises a pair of spring members engaged between said first member and respective opposing walls of said chamber to maintain said first member in a neutral position relative to said frame, different ones of said fluid passages being spaced on opposite sides of said neutral position to receive said fluid stream in response to relative displacements of said first member and said frame in either of two respective opposite directions.

9. The combination according to claim 8 further comprising a logic circuit including:
means for generating a plurality of fluid pulse trains at predetermined frequencies;
means for receiving fluid flow from preselected ones of said outlet passages of said force transducer;
gating means for passing different ones of said pulse trains in response to fluid flow in respective different ones of said force transducer outlet passages such that the frequency of the pulses passed by said gating means varies as a function of the differential force applied across said first and second members.

10. The combination according to claim 9 wherein said gating means comprises a plurality of AND gates, one each corresponding to respective ones of said preselected outlet passages of said force transducer.

11. The combination according to claim 10 further comprising binary counter means for counting the pulses passed by said pure fluid AND gates.

12. The combination according to claim 10 wherein said outlet passages are disposed such that said stream of fluid is received by successive ones of said outlet passages as a linear function of the relative displacement of said first member from said neutral position.

13. The combination according to claim 12 wherein successive frequencies of the pulse trains passed by said AND gates in response to respective fluid signals in the force transducer outlet passages are related to one another by the same linear function by which said fluid signals in said outlet passages are related.

14. The combination according to claim 1 further comprising:
means for generating a plurality of pulse trains at different frequencies; and
gating means for passing preselected ones of said pulse trains in response to respective predetermined levels of said fluid signal such that the frequency of the pulses passed by said gating means is a function of said input signal.

15. The combination according to claim 14 wherein said gating means comprises a plurality of AND gates, one each corresponding to the number of said predetermined levels of said fluid signal, each of said AND gates passing a different one of said pulse trains in response to a corresponding one of said predetermined levels of said input signals, and means for combining the pulses passed by said AND gates.

16. A logic circuit comprising:
a variable input signal;
means for generating a plurality of pulse trains at different frequencies; and
gating means for passing preselected ones of said pulse trains in response to respective predetermined levels of said input signal such that the frequency of the pulses passed by said gating means varies as a function of said signal.

17. The combination according to claim 16 wherein said variable input signal comprises a plurality of bi-level fluid pressures arranged in weighed succession, and wherein said gating means comprises a plurality of two-input pure fluid AND gates, each said gate receiving as its input signals a respective one of said bi-level fluid pressures and a respective one of said pulse trains.

18. The combination according to claim 17 further comprising binary counter means for counting the pulses passed by said pure fluid AND gate.

19. A force transducer for providing a fluid signal as a function of a differential force applied across said transducer, said transducer comprising:
  a first member having means for issuing a fluid stream;
  a second member having fluid receiving means, said fluid receiving means comprising at least three spaced outlet passages;
  means for mounting said members for relative displacement in response to application of a differential force across said members, said outlet passages being disposed such that each receives said fluid stream at respective relative positions of said first and second members;
  bias means for providing a counterforce to oppose said differential force, said counterforce acting to prevent relative displacement of said members upon application of differential forces thereacross below a predetermined level and for defining the degree of relative displacement of said members produced by application of the differential forces thereacross above said predetermined level.

20. A force transducer comprising:
  a first member having means for issuing a stream of fluid;
  a second member having an interior chamber and a row of at least three outlet ports communicating between the chamber and exteriorly of said second member;
  means for mounting said members for relative displacement in response to application of a differential force across said members, the path of said relative displacement being such that said fluid stream is directed toward different ones of said outlet ports for respective relative displacements of said members.

21. The force transducer according to claim 20 further comprising bias means for providing a counterforce to oppose said differential force, said counterforce acting to prevent relative displacement of said members upon application of differential forces across said members below a predetermined force level and for defining the degree of relative displacement of said members produced by application of differential forces across said members above said predetermined force level, and wherein the spacing between said outlet ports is chosen so that flow of said fluid stream through each outlet port is indicative of a respective differential force applied across said members.

22. The force transducer according to claim 21 wherein said fluid stream is directed toward a neutral position when zero differential force is applied across said members, and wherein a plurality of said outlet ports are disposed on both sides of said neutral position to receive said fluid stream for various magnitudes and polarities of differential forces applied across said members.

References Cited

UNITED STATES PATENTS

| | | | |
|---|---|---|---|
| 1,967,156 | 7/1934 | Moller | 244—78 |
| 2,364,128 | 12/1944 | Carlson | 244—78 |
| 2,382,727 | 8/1945 | Kronenberger | 244—78 XR |
| 3,142,981 | 8/1964 | Gross | 73—133 XR |
| 3,382,713 | 5/1968 | Chutter | 73—133 XR |

ANDREW H. FARRELL, Primary Examiner

U.S. Cl. X.R.

244—85